Patented July 31, 1928.

1,679,037

UNITED STATES PATENT OFFICE.

HANS KARPLUS, OF FRANKFORT-ON-THE-MAIN, AND WILHELM BACHMANN, OF SEELZE, NEAR HANOVER, GERMANY, ASSIGNORS TO THE FIRM E. DE HAEN A.-G., OF SEELZE, NEAR HANOVER, GERMANY.

BOILER COMPOSITION AND METHOD OF MAKING SAME.

No Drawing. Application filed May 8, 1926, Serial No. 107,825, and in Germany November 20, 1922.

Our invention refers to means for preventing the formation of boiler scale and for removing such incrustations as may have formed on the walls of boilers and the like. It includes the method of producing such compositions and disincrustants.

It has already been suggested to use pulverulent graphite, clay, sand and metal powder for preventing the depositing and adhering of boiler scale to the walls of steam boilers, preheaters and other heated surfaces in contact with hard water. However, all these substances are not capable of affording the desired protection, quite especially for the reason that they settle down very quickly in the water.

According to the present invention a high grade boiler composition and disincrustant is obtained if an inorganic substance which in its ordinary form does not dissolve in water or has only a very low solubility is reduced to a finely divided form. We have found that graphite, if converted into finely divided form, owing to its colloidal state remains in colloidal suspension in water, even in hot water, as a hydrosol either a long time or permanently and thereby creates a permanent protection for the walls by preventing the deposition of boiler scale. This substance is further capable of removing such scale as may already have settled down on the walls of the boiler, so that for instance an old boiler, the walls of which are covered with scale, when operated with water containing colloidal graphite, will soon resemble a new boiler.

Graphite can be reduced to colloidal state either by chemical or by mechanical means, and we have found that its action is the better the higher the degree of dispersion and the higher its stability in hot water.

In order to increase its stability the colloidal graphite is preferably protected by a particularly effective protective colloid. It required a lengthy investigation to ascertain such specifically suitable protective colloid which is especially distinguished by its superior stability at an elevated temperature; for most protective colloids have the undesirable property of frothing which renders them absolutely unfit for use in boilers.

We have found that waste sulphide liquor resulting in the cellulose production has superior protective properties as a colloid for the suspension of graphite.

The hydrosols produced with the aid of sulphite liquor show a surprising stability. Even at steam pressures up to 20 atms. the colloidal sols will not precipitate in the boiler feed water, but will act towards adsorbing the scale-producing salts. The separation of these salts therefore takes place in the form of a fine slime. A simple washing of the inner walls of the boiler with water suffices to free them from these salts. Old scale which already adheres to the boiler walls is loosened in a surprising way by the combined action of the colloidal graphite and the sulphite liquor and can be removed from the walls without using any tools, even by means of the fingernail.

A further advantage offered by the sulphite liquor consists therein that the boiler composition can be produced an sold in dry colloidosoluble form.

In the practice of our invention we prefer using colloidosoluble graphite in combination with sulphite liquor, in the form of a dried and ground mixture.

*Example.*—120 kgs. of a paste containing 50 kgs. colloidal graphite are ground with 329 kgs. sulphite liquor of 36–37° Bé. The resulting mixture is evaporated to dryness at a temperature of 70–80° C. The porous cake thus obtained is finely ground; it contains 20.2 percent graphite.

We wish it to be understood that we do not desire to be limited to the exact substances and operations above described for obvious modifications will occur to a person skilled in the art.

We claim:

1. As a new product for use as a boiler composition and disincrustant, a mixture of colloidal graphite and sulphite liquor, the colloidal graphite present in the mixture being approximately one-sixth by weight.

2. The method of preparing a boiler composition and disincrustant comprising drying a mixture of colloidal graphite and sulphite liquor and grinding the dried mixture, the colloidal graphite present in the mixture being approximately one-sixth by weight.

3. As a new product for use as a boiler composition and disincrustant, a mixture of collodial graphite and sulphite liquor, the amount of sulphite liquor present in the mixture being greater by weight than the quantity of graphite by weight.

In testimony whereof we affix our signatures.

HANS KARPLUS.
WILHELM BACHMANN.